Figure 1:
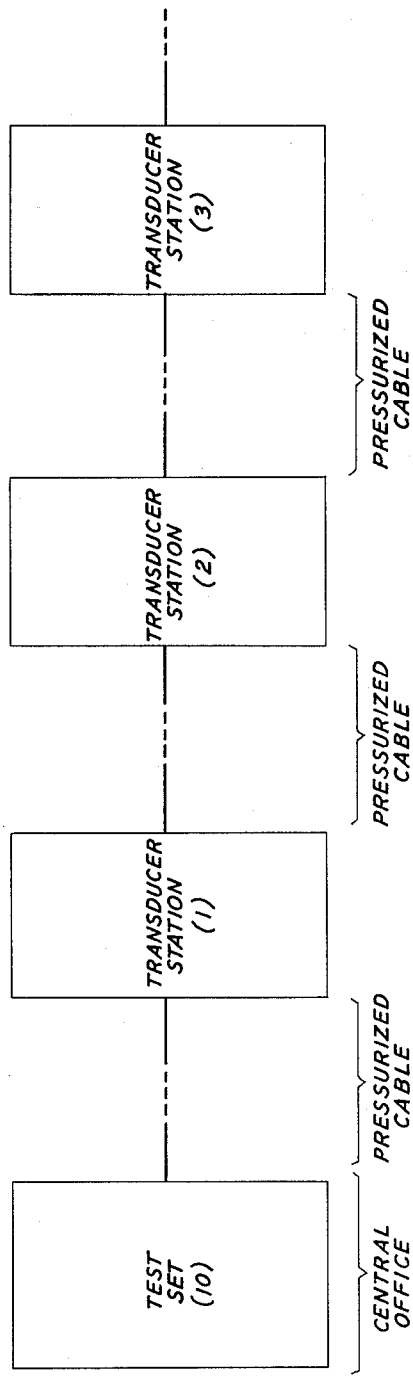

Oct. 1, 1963    G. E. HIGSON, JR    3,105,883
PRESSURE TRANSDUCER TESTING CIRCUIT
Filed Aug. 29, 1962    6 Sheets-Sheet 1

INVENTOR
G. E. HIGSON, JR.
BY
ATTORNEY

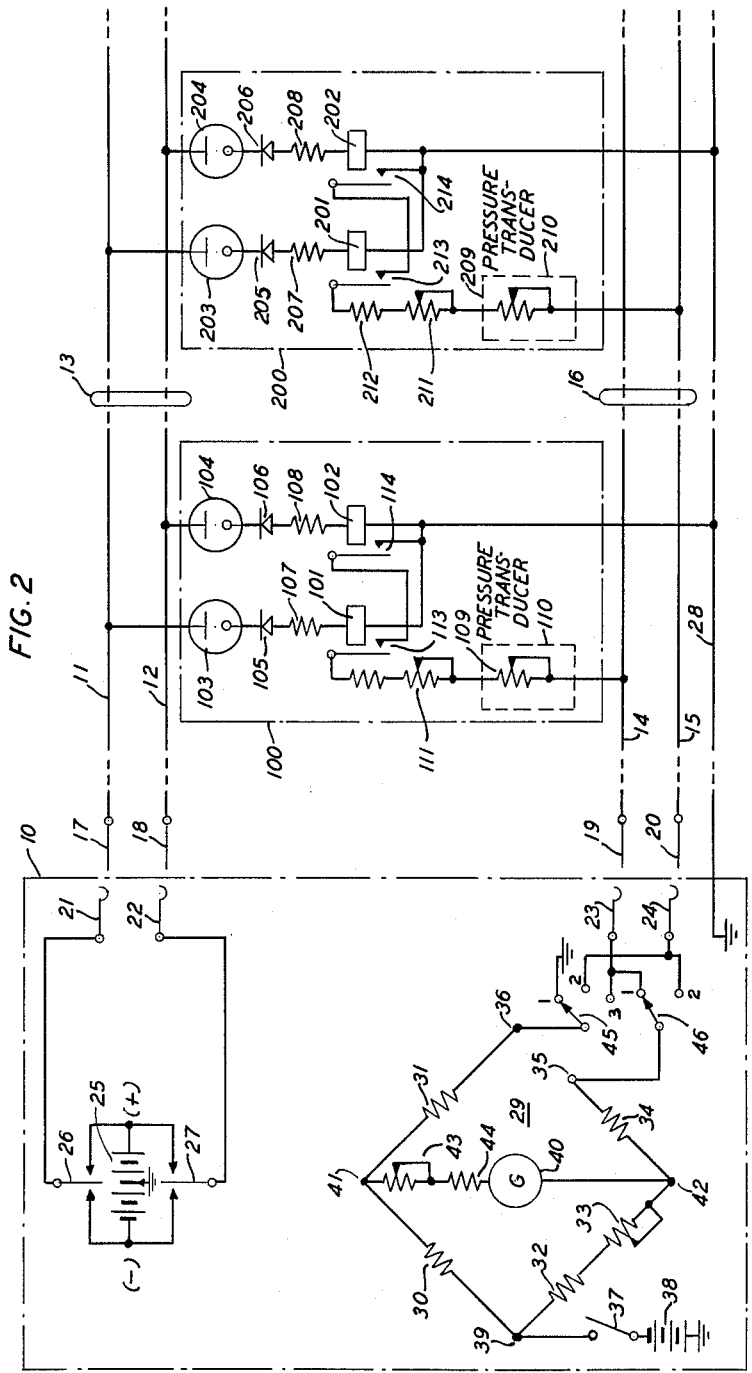

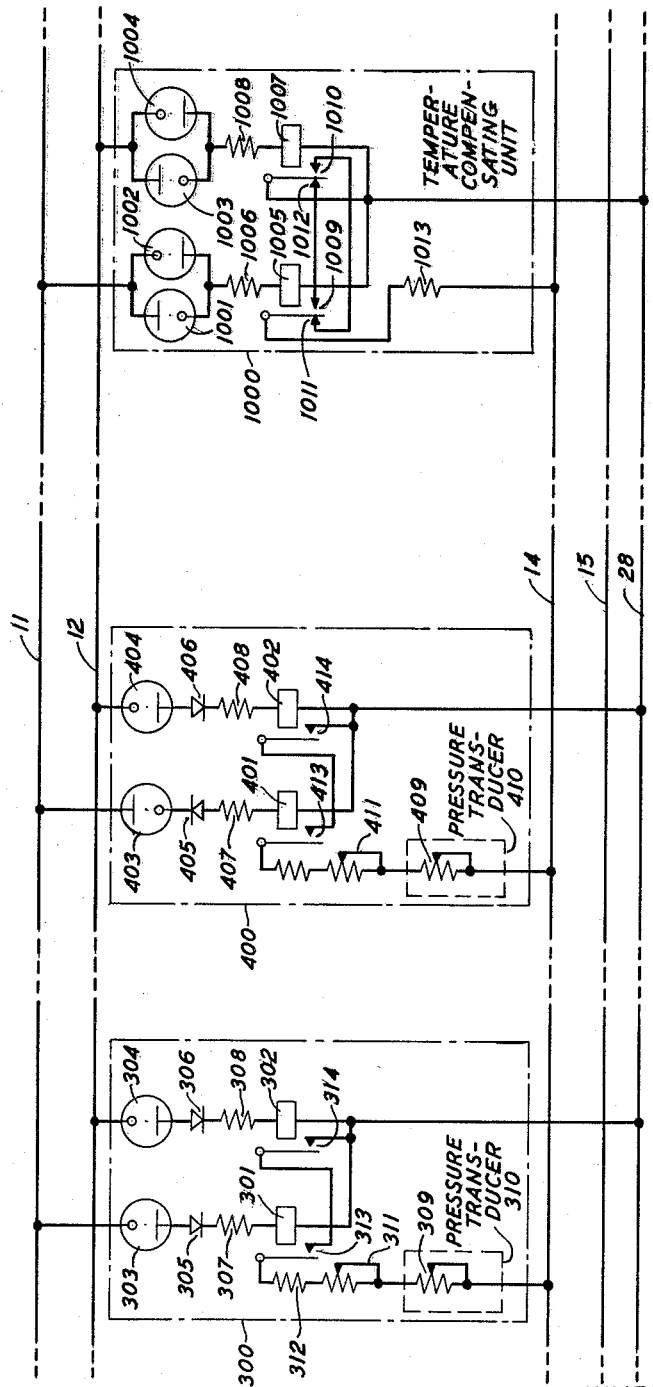

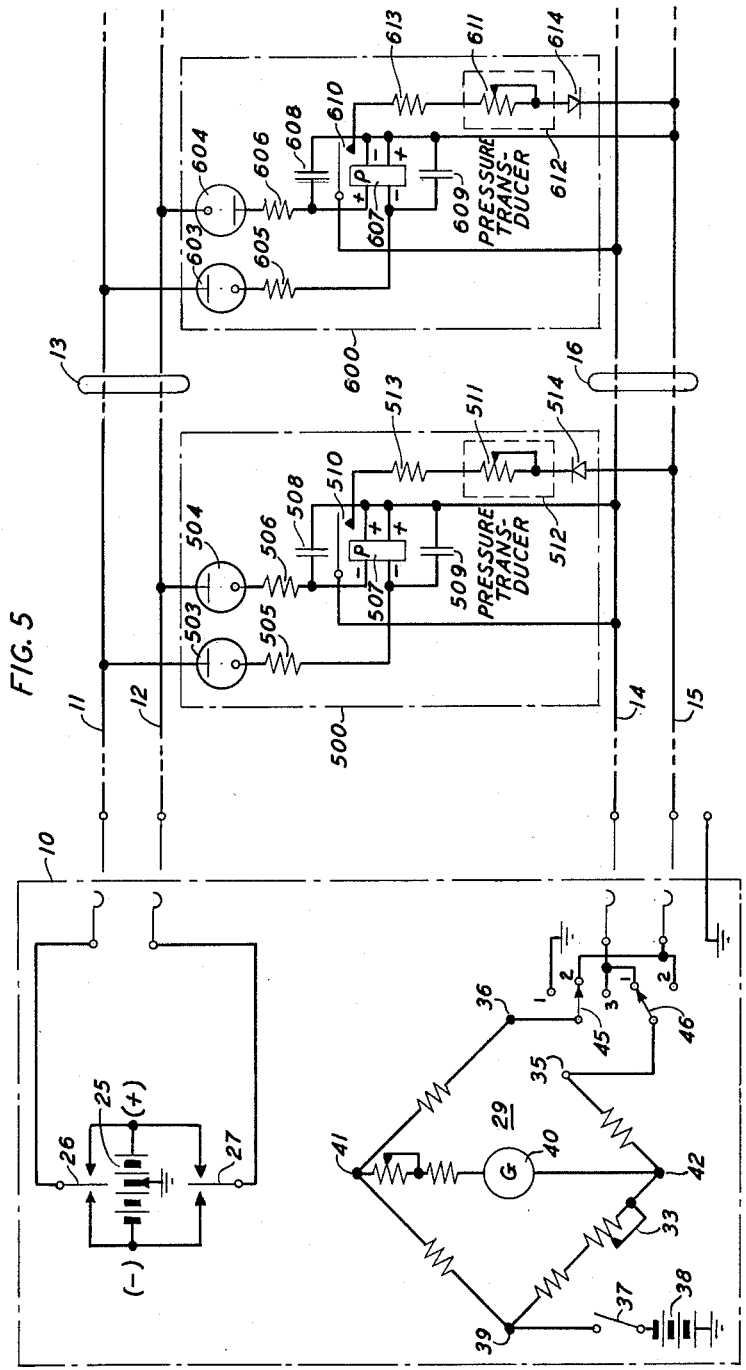

INVENTOR
G. E. HIGSON, JR.
BY
G. E. Hirsch Jr.
ATTORNEY

Oct. 1, 1963   G. E. HIGSON, JR   3,105,883
PRESSURE TRANSDUCER TESTING CIRCUIT
Filed Aug. 29, 1962   6 Sheets-Sheet 6
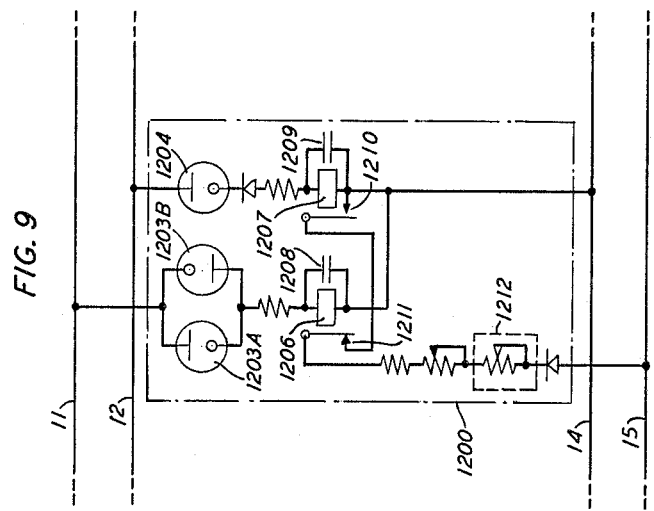
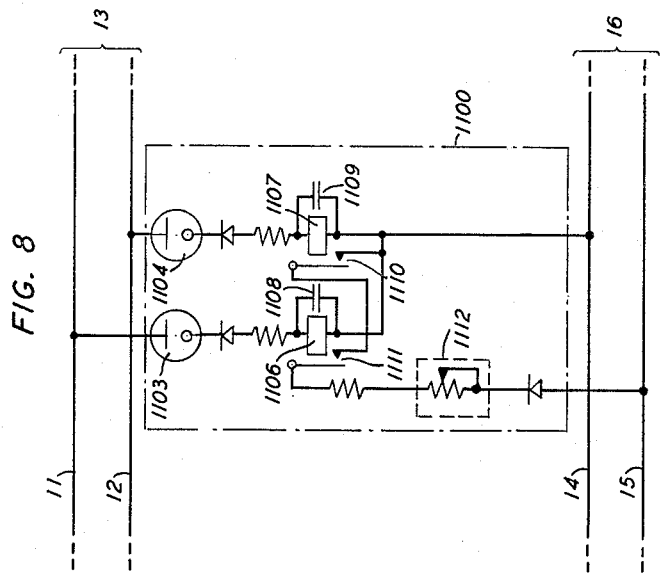
INVENTOR
G. E. HIGSON, JR.
BY
ATTORNEY United States Patent Office 3,105,883
Patented Oct. 1, 1963

3,105,883
PRESSURE TRANSDUCER TESTING CIRCUIT
George E. Higson, Jr., Norfolk, Va., assignor to American Telephone and Telegraph Company, New York, N.Y., a corporation of New York
Filed Aug. 29, 1962, Ser. No. 220,313
7 Claims. (Cl. 179—175.3)

This invention relates to testing systems and more particularly to testing systems for measuring the pressure at each of a plurality of spaced locations in a pressurized communications cable or the like.

One of the most difficult and time consuming jobs in maintaining communications cables in a pressurized atmosphere, e.g., of gas or dry air, is that of securing pressure readings at spaced points along the cable with a degree of accuracy sufficient to permit gradient plotting techniques and the like to be used to detect and locate the position of a leak or low pressure situation. On aerial cables, particularly, variations of temperature and barometric pressure encountered during the relatively long interval required for a technician to traverse a right of way, climb poles, and the like to obtain gradient data directly from each test position along the cable, result in information that frequently is inaccurate.

To avoid many of the problems involved in locating leaks by direct pressure measurements in the field, it has become common practice therefore to ascertain the approximate location of leaks via resistance measurements conducted at a central office. By placing a pressure sensitive contactor at each of a plurality of spaced intervals in a pressurized cable, it is possible to detect the presence, and to some extent, the location of a leak. Typically, the contactors are actuated when cable pressure falls below a preassigned level, and shunt the connecting cable pair with a fixed predetermined resistance. The resistance is then correlated with typical line resistance to identify the location of the leak. Although this technique eliminates, in large measure, the necessity for periodic field measurements, it, nevertheless, does not provide sufficient useful information for plotting accurate pressure gradients which permit a fault location to be accurately pinpointed. Further, for economy, the contactors normally are connected across the same cable pair. Consequently, there is no simple way to ascertain if more than one contactor is closed, so that an inherent ambiguity in fault location exists.

Fully automatic gradient plotting may be achieved by placing a pressure transducer at each of a number of specified cable locations and by periodically interrogating each to ascertain the momentary pressure condition at each location. While this supplies sufficient data for gradient plotting, it ordinarily requires extensive apparatus at each test location along the cable system and elaborate terminal equipment. More importantly, however, it normally requires the permanent service of several cable pairs between the terminal station and each of the several remote transducer locations. In a communications channel, a telephone pressure cable, for example, it is, of course, undesirable to tie up communication circuits permanently for test purposes.

It is the principal object of the present invention to avoid these shortcomings by securing accurate pressure gradient data electrically from measurements made solely at a central office test board. It is a further object of the invention to transmit pressure data from each of a number of remote stations to the terminal station in an economical fashion, one that does not substantially reduce the message carrying capabilities of the cable system.

In accordance with the present invention, these and other objects are fulfilled by means of a pressure testing system which utilizes a variable pressure-responsive transducer at each of a plurality of spaced test points along a pressurized cable. The instantaneous cable pressure at a given test point is translated by the transducer into resistance which is periodically measured at a common remote terminal station. Upon an appropriate command signal, transmitted to the individual transducer stations in coded form over a service pair in or accompanying the pressurized communication cable, one and only one of the transducers is connected across the same or a second service pair associated with the cable. The transducer resistance forms one of the balance arms of a bridge circuit, the other arms of which are located at the central office station. As thus connected across one of the service pairs, the transducer resistance completes the bridge circuit. By suitably balancing the bridge, the exact resistance of the transducer is measured. Since the transducer resistance is continuously adjusted automatically to register the momentary pressure within the cable, an immediate indication of cable pressure is obtained merely by converting resistance to pressure via a table or the like or, preferably, by calibrating the bridge balance indicator directly in pressure units.

Inasmuch as the interrogation circuits associated with the transducer and the transducer resistance elements do not upset or load either of the service pairs, these circuits may be used simultaneously for their normal services. Typically, a test circuit "talk" pair is used to convey momentary coded interrogation information, and an "alarm" pair is used to connect the transducer resistance to the station bridge circuit. In accordance with the invention, however, these functions may be selectively reversed, that is, the alarm pair may be used for interrogation, and the talk pair for connecting the transducer resistance to the central office. Both arrangements may thus be used in a single cable test setup, so that a great number of individual transducer stations may be connected using only two service pairs.

The invention thus features an arrangement for sequentially connecting a resistance element adjusted as a function of pressure in each of a plurality of remote stations along a cable to a bridge circuit at a central office.

In one embodiment of the invention, two diodes or the like connected respectively to the individual wires of the interrogation pair are used at each transducer station to respond selectively to coded information on the two wires of the pair, and one or the other wire of the second pair is used in conjunction with a common ground, typically the cable sheath or the like, to complete the bridge circuit. In an alternative arrangement, one wire of the "read" pair acts as a return or "ground" for the interrogate circuit, thus to avoid imposing any additional ground currents upon the cable sheath. With this arrangement, the transducer is connected between the wires of the read pair by way of an isolating diode or the like. In some applications, where the cable sheath is used for other services, this is advantageous. Additional diode elements in the transducer circuits, may be used to allow other code combinations to be employed so that additional transducer stations may be used without an increase in the number of wires necessary to connect the stations to the central office test position.

Although in the practice of the invention readings from each of the transducer stations are ordinarily made in a short interval of time in late evening or early morning hours to minimize excessive temperature variations and the like, it nevertheless has been found desirable to check periodically the effect of temperature on the resistance of the circuit. If variations are found, appropriate correction may then easily be made before additional readings are taken. It is thus in accordance with the invention to utilize remotely located temperature checking apparatus which may be interrogated from the central office at any time to provide an indication of the effect of temperature on the transducer stations. Preferably, temperature checking apparatus is situated at the transducer station most remote from the central office station; it has been found that one check point is sufficient.

In the detailed description of the apparatus by which the principles of the invention are turned to account in a practical communications system, simplified manual controls are illustrated at the central office station. Controls of this sort are perfectly adequate for realizing the potentials of the invention. However, it may be desired to employ fully automatic apparatus at the central office station which performs the several manual operations as required in turn, in response to a single manual command. Such apparatus, may of course be devised and employed by those skilled in the art; it forms, however, no part of the present invention.

Each of the transducer stations is, in practice, enclosed in a waterproof, airtight container mounted, for example, in a splice-covering along the cable. In order to measure the differential pressure between the inside of the cable and atmosphere, a vent is employed to couple one side of the transducer to the atmosphere. This is done by means of an auxiliary connection between the transducer station and the atmosphere.

Figure 4:
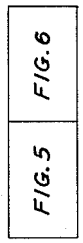
Figure 7:
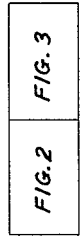
Figure 6:
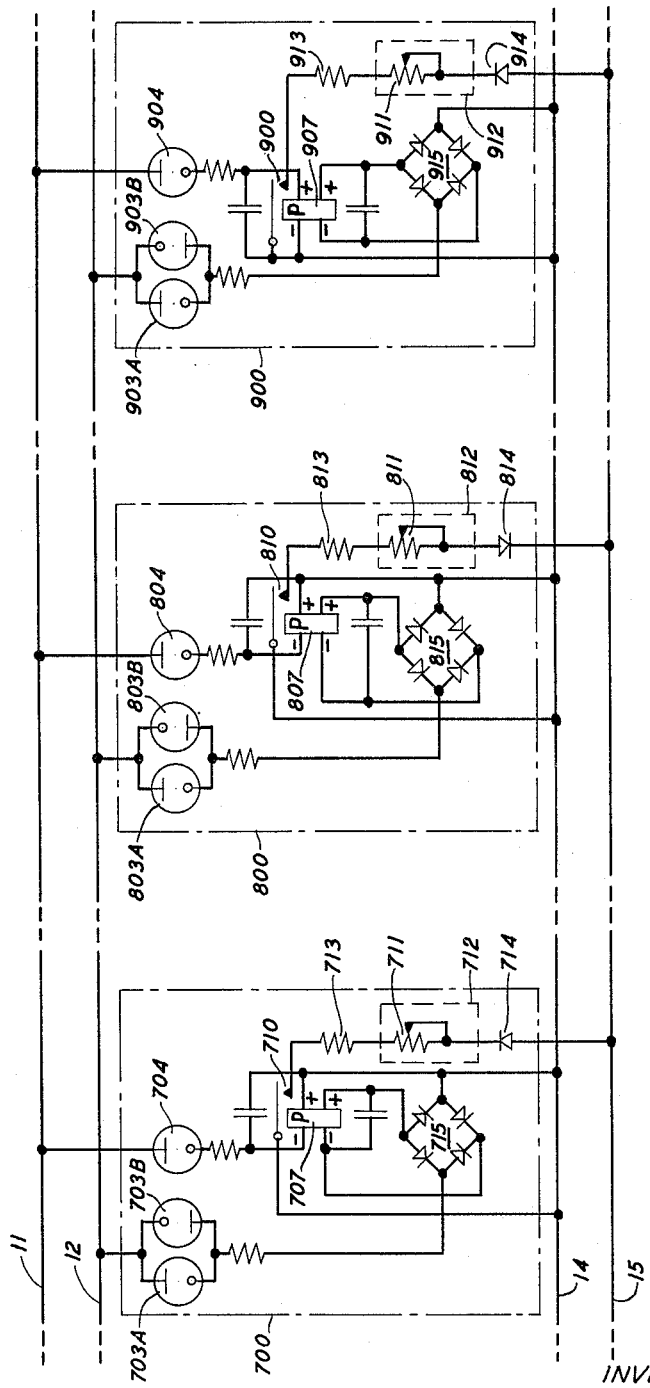

The invention will be fully apprehended from the following detailed description of illustrative embodiments thereof taken in connection with the appended drawings, in which:

FIG. 1 is a block schematic diagram of a typical system for testing the pressure at a number of points within a pressurized cable;

FIGS. 2 and 3 connected as shown in FIG. 4 comprise a detailed schematic diagram of a central office station test set and several remotely positioned transducer stations which illustrates the principles of the invention;

FIGS. 5 and 6 connected as shown in FIG. 7 illustrate an alternative form of pressure measuring system that embodies the principles of the invention;

FIG. 8 illustrates a transducer station suitable for use in the system of FIGS. 5 and 6; and FIG. 9 illustrates an alternative form of transducer station suitable for use in the practice of the invention.

The typical pressure measuring system illustrated in FIG. 1 comprises a test set 10, which is normally situated at a central office station, and a number of transducer stations 1, 2, 3, . . . located at spaced points along a pressurized cable. Transducer spacings of 12,000 to 25,000 feet are typical. In accordance with the present invention, the pressure within the cable at each of the transducer stations is ascertained at the central office by supplying coded interrogation signals from test set 10 to all of the transducer stations via a service line pair in or accompanying the pressure cable. By properly coding the interrogation signals, only that one transducer specified by the code responds and, in return, transmits pressure data via a second service line pair to the test set. Only two line pairs are required for the interrogation and read operations. Although any signal pairs may of course be used, with this arrangement normal communication lines within the cable are not taken out of service or disturbed. Moreover, because of the fashion in which the transducer stations are connected to the service pairs, these pairs may be used for their normal functions when not actually being used for pressure measurements.

FIGS. 2 and 3, connected as shown in FIG. 4, schematically illustrate one embodiment of the present invention. Test station 10, normally located at the central office station, may be connected to wires 11 and 12 of service pair 13 and to wires 14 and 15 of service pair 16, when it is desired to measure the pressure of the pressurized cable (not shown, but which extends from the central office at which test set 10 is located to a remote central office), by means of suitable patch connectors 17, 18, 19, and 20, and jacks 21, 22, 23, and 24. Service pair 13 normally is used as an auxiliary talk circuit within the pressurized cable, and cable pair 16 is ordinarily used as an alarm circuit. In order to interrogate one and only one of the transducer stations 100, 200, 300, . . . along the cable system, coded interrogation signals are transmitted on the talk pair 13 from the test station 10 to all of the transducers. The coded information is in the form of positive or negative potentials on each of the two wires 11 and 12 of the pair. Thus, a battery 25 may be connected via switches 26 or 27 to either wire or both with either polarity. Four distinct code combinations are available if potentials are applied simultaneously to both wires; many more if both one and two wire combinations are used.

Each transducer station includes means for responding to a particular one of the code combinations, and a pressure operated transducer which is continuously adjusted according to the momentary pressure condition at that cable location. Considering, for example, transducer 100, two relays 101 and 102 are connected, respectively, between the wires of cable pair 13 and ground by way of asymmetrical conducting devices 103 and 104, respectively, which may be gas diodes or the like, poled in accordance with the particular code assigned to transducer 100. Thus, if a negative potential appears on both wires of pair 13, gas tubes 103 and 104 both fire and conduct to operate relays 101 and 102. Diodes 105 and 106 and limiting resistors 107 and 108 are included as a precautionary measure to prevent unwarranted closing of the relays should the gas tubes fail and fire in the reverse potential direction. Limiting resistors 107 and 108 also serve to limit the current in their respective circuits to a value no higher than necessary to insure satisfactory relay operation. The combination of two diodes thus is a practical circuit arrangement which may, of course, be replaced by a single asymmetrical conducting device of appropriate voltage ratings. Relays 101 and 102 are closed by current passing from the ground connection 28 common to the transducer station to diodes 103 and 104, the test station 10, and battery 25 at the test station. Ordinarily the conductive sheath enclosing the pressure cable itself may be used as the common ground return. As indicated, the several transducer stations and test set 10 are tied permanently to ground conductor 28.

With both relays 101 and 102 in the closed or operate position, potentiometer 109 of pressure operated transducer 110 is connected between one wire, e.g. 14 of cable pair 16 and ground connection 28 by way of potentiometer 111, calibrating resistor 112, and the now closed contacts 113 and 114 of relays 101 and 102. For all other combinations of code signals on wires 11 and 12 of cable pair 13, one or the other or both of relays 101 and 102 fail to operate and contact 113 or 114 or both remain open; in this eventuality, the circuit for transducer 110 is not completed.

Transducer 200 at the next spaced location along the cable is similarly constructed and includes elements identical to those in transducer 100. Diodes 203 and 204 are, in this example, poled in the same directions as those at transducer station 100 so that both relays 201 and 202 close for code combination which consists of negative potential on both wires 11 and 12. However, potentiometer 209 of transducer 210 is connected, when contacts 213 and 214 of relays 201 and 202 are closed, between wire 15 of cable pair 16 and ground instead of between wire 14 and ground. As a result, although the relays of both station 100 and 200 are energized for the same "negative-negative" code combination, each transducer is connected in an independent circuit, e.g., between either wire 14 or 15 and ground. Each transducer may be read individually at test set 10 (in the manner to be described below). Transducer station 300 contains the same structural arrangement as transducers 100 and 200 but diodes 303 and 304 are both poled in the positive direction and transducer 310 is connected, when relays 301 and 302 are actuated, between wire 14 of cable 16 and ground. The diodes 403 and 404 of transducer 400 are shown, by way of example, poled in opposite directions. That is, diode 403 is shown in the negative direction and diode 404 in the positive direction. Consequently, transducer 410 is connected between wire 14 and ground 28 when a negative potential appears on wire 11 and a positive potential on wire 12.

It is evident that the remaining transducer stations in the system (not shown) are of identical construction to those shown save for the polarities of the diodes (corresponding to 103 and 104) and the connections used to connect the transducer potentiometers (corresponding to 109) between the wires of service pair 16 and ground. As will be described hereinafter a potential on one wire only may also be used as a code combination; such an arrangement substantially increases the number of transducer stations that may be serviced from a single test station.

It is now apparent that as the switches 26 and 27 in test set 10 are adjusted to supply positive or negative potentials to lines 11 and 12, only one transducer station in the system will respond to the interrogation, and only the resistance of one transducer at a time will be connected between a conductor of pair 16 and ground. In order to read the value of that one transducer so connected, a bridge circuit 29 at test set 10 is employed. It may be of the so-called Wheatstone bridge variety and include two pairs of matched ratio arms, one fixed and the other variable. The fixed arms include resistors 30 and 31. One of the variable arms includes resistor 32 and potentiometer 33, and the other includes a fixed resistor 34, equal in value to fixed resistor 32 in the corresponding ratio arm, and a pair of terminals 35 and 36 to which may be connected one of the pressure transducer variable resistors, e.g., 109, 209, . . . . When thus connected, the transducer resistance completes the bridge. Switch 37 is then closed to connect battery 38 between terminals 36 and 39 of the bridge, and bridge balance noted on a null indicating device, for example, galvanometer 40 connected between terminals 41 and 42 of the bridge. Calibrating potentiometer 43 and a multiplier resistor or the like 44 may be connected in series with galvanometer 40.

In order to connect the resistance of the interrogated transducer to the bridge, it is necessary, of course, to select the correct lead 14 or 15 of line pair 16 to which the transducer resistance in that station is connected. Switches 45 and 46 may be used for this purpose. If, for example, the transducer resistance is connected between wire 14 and ground 28, switch 45 is connected to switch position 1 and hence to ground, and switch 46 is connected to switch position 1. If the remotely positioned transducer resistance is connected between wire 15 and ground, switch 45 remains in switch position 1 but switch 46 is moved to position 2.

With the proper adjustment of switches 45 and 46, potentiometer 33 may then be adjusted to indicate a null on meter 40. When this condition obtains, the resistance of potentiometer 33 is exactly equal to that of the transducer resistance connected to terminals 35 and 36 of the bridge. This may be read directly in resistance and converted to pressure or, preferably, read directly in pressure units.

Since it is desirable to enclose the transducers 110, 210, 310, . . . in waterproof and airtight housing so that a minimum of maintenance is required, it is preferable to measure the differential pressure between the inside and outside of the cable system. This is done conveniently by enclosing the transducer in an airtight container and ducting one side to the interior of the pressure cable and the other to the outside. The duct pipe to the outside must be open to the atmosphere but may nevertheless be plugged with Fiberglas or the like to prevent foreign material from entering.

Although with the arrangement shown, the transducer resistance values of all of the stations along the pressurized cable may be read in a short period of time, for example, during late evening or early morning hours at which time the temperature along the cable is most likely to be stable, it has, nevertheless, been found that from time to time temperature variations alter the resistance of the lines connecting the several transducer stations. Further, because the transducer resistance measurements are not made against another, second, cable pair of equal length and exposure, some convenient way of checking for resistance changes due to temperature variations is desirable. It is in accordance with the invention, therefore, to provide apparatus for compensating for wire resistance changes due to temperature variations. This is done by employing a temperature compensating unit, preferably located near the transducer stations farthest removed from the test set. It has been found that if the transducer circuit resistance of each transducer station is properly selected with reference to normal system line resistance, and to the resistance of the compensating unit which appears in the "read" circuit, a resistance measurement made at a single one of the stations along the line, e.g., at the last transducer station, provides sufficient information with which to make compensating adjustments to the test set.

Such a temperature compensating unit 1000 is illustrated in FIG. 3. Its construction is substantially identical to that of the several transducer stations. It is however poled by means of diode pairs 1001 and 1002 and 1003 and 1004 to respond to either polarity of interrogation voltages supplied to either one of wires 11 and 12 of line pair 13, but not to both. It would appear that no purpose is served by using diodes and passing both polarities of operating current. They are used, however, to insure identical forward conducting resistance conditions and further to provide low voltage isolation. Diodes 1001 and 1002 are thus connected with opposite polarities in a parallel configuration; similarly, diodes 1003 and 1004 are connected with opposite polarities in parallel. Hence, for a voltage of either polarity on line 11, relay 1005 is actuated by the passage of current from diode 1001 or 1002 via resistor 1006 to ground conductor 28. Similarly, for a positive or negative voltage on line 12, relay 1007 is actuated by current passing by way of diode 1003 or 1004 and resistor 1008 to ground. When actuated, relay 1005 connects fixed compensating resistor 1013 between wire 14 and ground 28 by way of contact 1009 and normally closed contact 1012 of relay 1007. When relay 1007 is actuated, resistor 1013 is connected to the read circuit by way of normally closed contact 1011 of relay 1005 and contact 1010 of relay 1007. If both relays are actuated, contacts 1011 and 1012 are open, and an open circuit results. With a closed circuit, calibrating resistor 1013 is connected to bridge 29 (with switches 45 and 46 both in the 1 position) at test set 10. Balance potentiometer 33 in the bridge is adjusted to the known calibration resistance value, and the bridge is balanced by adjusting potentiometer 43 in the galvanometer circuit. Thereafter, the value of potentiometer 33, for indications of bridge null, is equal to the value of resistance connected to terminals 35 and 36. In practice, bridge circuit 29 at test station 10 need be balanced to zero only for the initial temperature check adjustment; i.e., it is calibrated using resistor 1013. All subsequent transducer readings are then indicated on the meter as deviations from zero. This makes any further balancing operations unnecessary and permits the meter scale to be marked directly in pressure units; the degree of unbalance may thus be read directly in pressure units.

All transducer stations are arranged, in accordance with another feature of the invention, to compensate for loop resistance differences and to facilitate readings on the meter in the bridge circuit. The resistance of one side of the measurement pair to the most distant location is used as the reference value. The transducer circuits at each intermediately located station are equipped with a compensating resistor of such a value as to equal the resistance of one side of the loop between its location and that of the most distant station. By adjusting the line resistance to each unit to be equal to the greatest line resistance and by equating this resistance to zero at the control panel, the only resistance read at the test station is that of the transducer itself; all line resistances are effectively balanced out. In practice, a wire wound resistor is installed in the transducer circuit at each station to equate the total resistance of each unit to the resistance check unit farthest from the test set. Resistors 112, 212, 312, . . . are included for this purpose. Copper wire wound on insulating spools is used for these resistors in order further to compensate as much as possible for variations in line resistance to temperature change. A potentiometer, e.g., 111, 211, 311, . . ., is used to compensate for the error between computed line resistance and actual field conditions.

In some installations the use of the cable sheath as the ground return is undesirable. It is in accordance with the present invention, therefore, to adapt the transducer station elements to accommodate this situation, that is, to employ only the talk and alarm pairs, and not to rely on an external ground to complete any of the necessary circuits. In effect, interrogation and reading of the several transducers takes place by the combined efforts of a polarized battery, a polarized relay and a timing circuit. FIGS. 5 and 6 connected as indicated by FIG. 7 illustrate such an arrangement. Test set 10 may be identical to that illustrated in FIG. 2. Transducer stations 500, 600, 700 . . ., are spaced along the cable as before. If desired, a transducer station 1000 (not shown) may again be used at the remote end of the cable system to permit temperature variations to be measured. Considering transducer station 500 for the moment, interrogation potentials, either positive or negative, or both which appear on wires 11 and 12 of line pair 13, are selectively passed by gas diodes 503 and 504 and resistors 505 and 506 to the individual windings of a polarized relay 507. If the interrogation potentials are properly coded for the station, e.g., both negative for station 500, both diodes conduct and both windings of relay 507 are energized and aid one another so that it is actuated. Current passes through both windings from ground via wire 14 of line pair 16, contact 2 of switch 45 and the bridge circuit. Short pulses of interrogating potential only, on the order of several seconds, are supplied to wires 11 and 12 so that relay 507 is actuated. It is held closed thereafter by the charge stored on capacitors 508 and 509 which bridge the two windings of the relay, respectively. Thus, the code potentials on wires 11 and 12 are used only to actuate the relay initially and are then removed and current flow through the circuit of wire 14 and the bridge ceases. The relay remains in an operate position for an interval thereafter dependent upon the time-constant of the relay and its associated capacitor. When actuated, relay 507 closes contact 510 to connect potentiometer 511 of pressure operated transducer 512 between wires 14 and 15 of line pair 16. A calibrating resistor 513 is included in the transducer series circuit as before so that line resistance can be balanced out. An additional element, diode 514, is included in the transducer circuit. As will be explained below, this element permits, through its asymmetrical conducting characteristics, twice as many individual stations to be connected via the same read pair 16 to the test station. Further, it serves to isolate the transducer from possible influence by the interrogate circuit. By reversing the polarity of diode 514, another station (not shown) may be used to respond to the same code potentials (negative-negative), but switches 45 and 46 at test set 10 must be reset to positions 3 and 2, respectively, so that current from battery 38 in bridge 29 can pass through the resistance arm (the transducer element) connected between terminals 35 and 36 of the bridge.

For transducer station 600, another combination of interrogation potentials may be used, for example, a negative potential on wire 11 and a positive potential on wire 12 actuates diodes 603 and 604 to close polarized relay 607. The windings of relay 607 are wound so that opposing currents in the two windings aid in closing the contact 610. The current path through both relay windings is completed, in the exemplary station 600, by way of wire 15, switch 46 and the bridge 29. In the examples shown herein, no advantage is apparent in utilizing one wire of pair 16 in lieu of the other. However, it will be readily apparent to those skilled in the art, that by employing a more complex switching arrangement, either one of wires 14 and 15, but not both, can be made to act as ground return so that the number of code combination available can be increased by a factor of two. In actual practice, a separate push button is employed for automatically setting up the required code combination, e.g., the correct setting of switches 26 and 27, and the required connections for connecting line pair 16 to the bridge with ground on the correct pair. Although somewhat more complex to implement than the simplified manual switching arrangements shown, the principles of operation are the same. When actuated, relay 607 connects potentiometer 611 of transducer 612 across wires 14 and 15. With switches 45 and 46 at test station 10 suitably adjusted in accordance with the polarity of diode 614, the value of resistor 611 is read on the bridge. As before, another station, (not shown) may be utilized for the same negative-positive code combination by reversing the polarity of the diode equivalent to diode 614.

Although the use of a single polarized relay, e.g., 507, simplifies construction of the transducer station and is to be preferred, two relays each bridged by a capacitor to provide suitable hold-over may be used. FIG. 8 illustrates such an arrangement. Its construction is in many ways similar to that of station 200 (FIG. 2), except that ground return is by way of wire 14. As illustrated, station 1100 responds to a negative-negative code on wires 11 and 12 and places transducer 1112 across wires 14 and 15. Capacitors 1108 and 1109 shunt relays 1106 and 1107 to hold the relays closed at the cessation of interrogation. When and only when both relays are closed, is the transducer connected to the test set bridge.

With the embodiment of the invention shown in FIGS. 5 and 6 it is advantageous to utilize additional code combinations involving a single potential, either positive or negative, on one wire only of interrogate pair 13. This is accomplished, for example, by arranging the elements of each transducer station as shown in transducer stations 700, 800, and 900. Diode 704 responds in the manner described above to the appropriate positive or negative potential on wire 11 and energizes one winding of polarized relay 707. Relay 707 is adjusted to operate with this current only, that is, it operates if the primary winding only is energized. Thus, in the absence of any potential on wire 12, the relay is closed and potentiometer 711 of transducer 712 is connected via contact 710, calibrating resistor 713 and poled diode 714 across line pair 16. If a potential of either polarity appears on wire 12, it is passed by way of diodes 703A or 703B, connected with opposite polarities in parallel, to bridge rectifier 715, and thence to the secondary winding of polarized relay 707. The secondary winding is connected in opposition to the primary winding so that a current therethrough prevents the relay from operating. With this arrangement, a pusle of whatever polarity on wire 12 causes current flow via diode combination 703, and bridge 715 to cancel the primary urge of relay 707 to operate, and contact 710 remains open. Hence, there is no interference with a double potential code of transducer 500 through 700 (and those connected to respond to double code combination). Consequently, the same "read" combinations, including the "code" involved in the poling of diodes 714, 814, 914, . . ., is concerned, may be used for transducer stations 700 to 900. With this coding arrangement, thirty-two separate transducers may be utilized on the line and actuated independently with two potentials positive or negative applied selectively to wires 11 and 12 of line pair 13.

As before, the single polarized relay may be replaced by a pair of interconnected relays, each shunted by a capacitor. FIG. 9 shows the necessary circuit connections. Diode 1204 is poled to respond to the assigned single code potential and for a brief negative potential on wire 12 closes relay 1207. If there is no potential on wire 11 at this time, transducer 1212 is connected via contacts 1210 and 1211 between wires 14 and 15. If a potential of either polarity appears on wire 11, relay 1206 is closed, contact 1211 is opened, and no action ensues. In the manner described above, the several diodes may be poled in a number of combinations, and a number of different code arrangements may be obtained with the circuit of FIG. 9.

The above-described arrangements are, of course, merely illustrative of the application of the principles of the invention. Numerous other arrangements may be devised by those skilled in the art without departing from the spirit and scope of the invention.

What is claimed is:

1. In a telephone system, a central office including a test station, a plurality of line pairs extending from said central office in a pressurized cable, and means for measuring the pressure within said cable at a number of prescribed locations along its length, said pressure measuring means comprising a transducer at each of said prescribed locations for converting pressure within said cable to resistance, signal responsive means at each of said locations for connecting said transducer across one of said line pairs in response to coded signals transmitted from said test station to said transducer location over another one of said line pairs, and means at said test station for individually measuring the resistance of the transducer that at any instant is connected across said one line pair.

2. Testing apparatus for use with a telephone system, which system includes a central office, a test station located at said central office, and a plurality of line pairs extending from said central office in a pressurized cable, comprising, means for measuring the pressure within said cable at a number of prescribed points along its length, said pressure measuring means comprising at each of said prescribed locations a transducer station which includes means for converting pressure within said cable to resistance, means for selectively interrogating said transducer stations in accordance with a prescribed code signal transmitted from said test set to each of said transducer stations via a first one of said line pairs, means at each of said transducer stations responsive to said interrogating signals on said one line pair for connecting said converting means across a second one of said line pairs, and means at said test station for individually measuring the resistance of the pressure transducer that at any instant is connected across said first line pair.

3. Testing apparatus as defined in claim 2 wherein said means at each of said transducer stations for responding to said interrogating signals includes a first relay responsive to a potential of preselected polarity on one of the wires of said first line pair and a second relay responsive to a potential of preselected polarity on the other wire of said first line pair, the contacts of said relays when actuated in accordance with a particular prescribed code of potentials on the wires of said first line pair completing said connection of said converting means across said second line pair.

4. Testing apparatus as defined in claim 2 wherein said means at each of said transducer stations for responding to said interrogating signals includes a polarized relay with two independent actuating elements, and a normally open contact associated with said polarized relay in circuit relation with said converting means and said second line pair, the two actuating elements of said relay being responsive, respectively, to a particular prescribed code of potentials on the wires of said first line pair.

5. Apparatus for measuring the pressure at a plurality of points spaced along a pressurized cable system comprising a central office test station and a plurality of transducer stations, said transducer stations being spaced at prescribed intervals along the length of said cable, means in each of said transducer stations for converting the momentary pressure in said cable into a corresponding resistance value, a bridge circuit located in said central office station provided with first and second matched ratio arms, a third variable resistance ratio arm, means for indicating bridge balance, and potential means for energizing said bridge, means including a first auxiliary line pair for connecting terminals of the fourth ratio arm of said bridge to all of said transducer stations, means including a second auxiliary line pair for connecting said test station to all of said transducer stations, means at said test station for supplying coded signals in the form of combinations of positive and negative polarity potentials to the lines of said second line pair in accordance with a pre-established code, means at each of said transducer stations responsive to a particular code signal on said second line pair for connecting the resistance element of said transducer station to said first auxiliary line pair whereby said resistance element is connected to said bridge circuit for use as the fourth ratio arm of said bridge.

6. Apparatus for measuring the pressure at a plurality of points spaced along a pressurized cable system comprising a central office test station and a plurality of transducer stations, said transducer stations being spaced at prescribed intervals along the length of said cable, means in each of said transducer stations for converting the momentary pressure in said cable into a corresponding value of resistance, a bridge circuit located in said central office station provided with first and second matched resistors in first and second ratio arms, a variable resistor in a third ratio arm, a fourth ratio arm, means for indicating bridge balance, and potential means for energizing said bridge, means at said test station for conveying coded signals over a first auxiliary line pair to all of said transducer stations, a second auxiliary line pair connected in said fourth ratio arm and extending to all of said transducer stations, means in each of said transducer stations for selectively responding to said coded signals on said first auxiliary line pair and for connecting said pressure controlled resistance across said second auxiliary line pair, and adjustable resistor means in circuit relation with said pressure controlled resistance in each of said transducer stations, said adjustable resistance means at each station being adjusted in value to equal the normal line resistance of said second auxiliary line pair extending therefrom to the transducer station most distant from said test station, whereby variations in line pair resistance between said several transducer stations and said test set are eliminated from bridge measurements of said pressure controlled resistance.

7. Apparatus as defined in claim 6 which includes a calibration station situated at the transducer station most distant from said central office test station, said calibration station including a resistor of preselected fixed value, and means responsive to selected code signals on said first auxiliary line pair for connecting said fixed value resistor across said second auxiliary line pair.

No references cited.